US011038370B2

(12) United States Patent
McCollum

(10) Patent No.: US 11,038,370 B2
(45) Date of Patent: Jun. 15, 2021

(54) ENCLOSURE WITH MODULAR TRAYS FOR CONTROLLING POWER AND COMMUNICATION

(71) Applicant: Toshiba International Corporation, Houston, TX (US)

(72) Inventor: William McCollum, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 155 days.

(21) Appl. No.: 16/518,509

(22) Filed: Jul. 22, 2019

(65) Prior Publication Data

US 2021/0028645 A1 Jan. 28, 2021

(51) Int. Cl.
*H02J 9/06* (2006.01)
*H01M 50/20* (2021.01)

(52) U.S. Cl.
CPC ............... *H02J 9/06* (2013.01); *H01M 50/20* (2021.01)

(58) Field of Classification Search
CPC .................................. H02J 9/06; H01M 50/20
USPC ..................................................... 307/66, 64
See application file for complete search history.

(56) References Cited

U.S. PATENT DOCUMENTS 6,310,783 B1 * 10/2001 Winch .................. H02J 7/0029
361/797
7,589,436 B2 * 9/2009 Takahashi ................. G06F 1/30
307/66

\* cited by examiner

*Primary Examiner* — Michael R. Fin
(74) *Attorney, Agent, or Firm* — Baker Botts L.L.P.

(57) ABSTRACT

The systems and methods of the present disclosure relate to uninterruptible power supplies, more particularly, to an enclosure configured to control an uninterruptible power supply. An enclosure comprises: a top wall, a bottom wall, wherein the bottom wall is disposed parallel to the top wall, sidewalls, wherein a bottom end of each of the sidewalls is disposed along opposing sides of the bottom wall so as to be perpendicular to the bottom wall, wherein the top wall is disposed about a top end of each of the sidewalls, a communications assembly tray; one or more power fuse assembly trays; and one or more micro-switches, wherein the one or more micro-switches are disposed onto the sidewalls, wherein the one or more micro-switches are configured to secure and indicate that the communications assembly tray and the one or more power fuse trays have been secured into the enclosure.

20 Claims, 4 Drawing Sheets

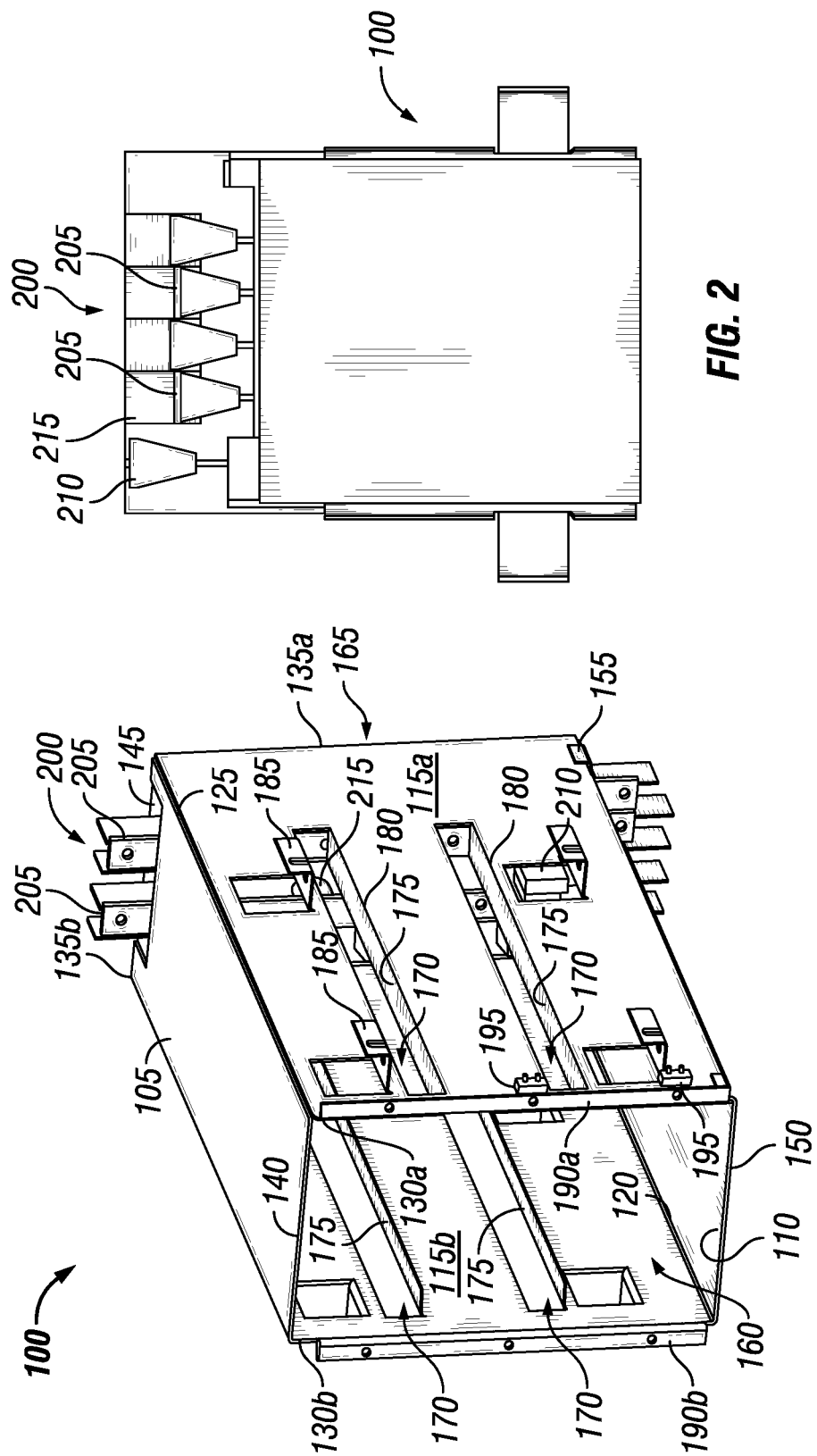

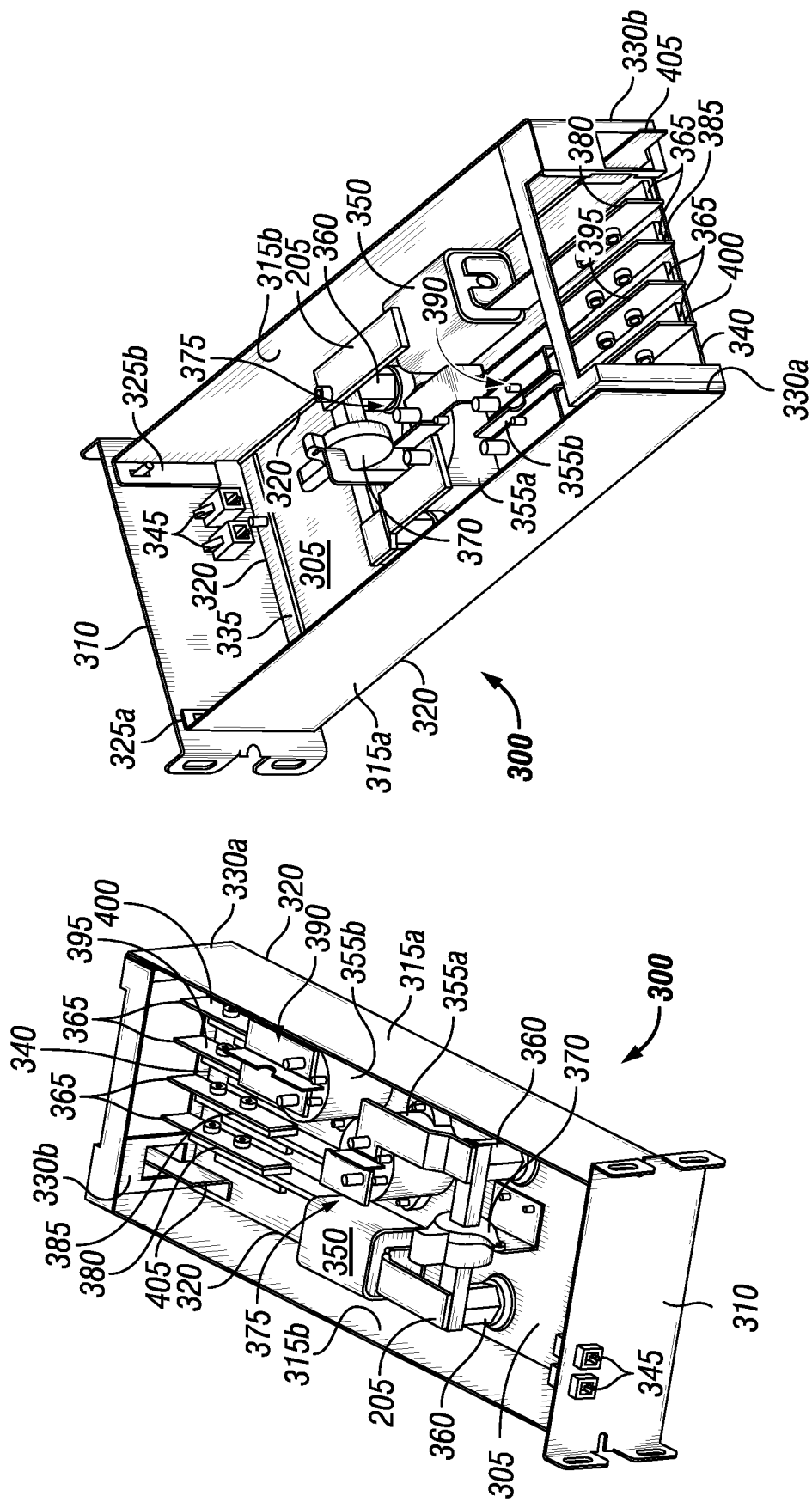

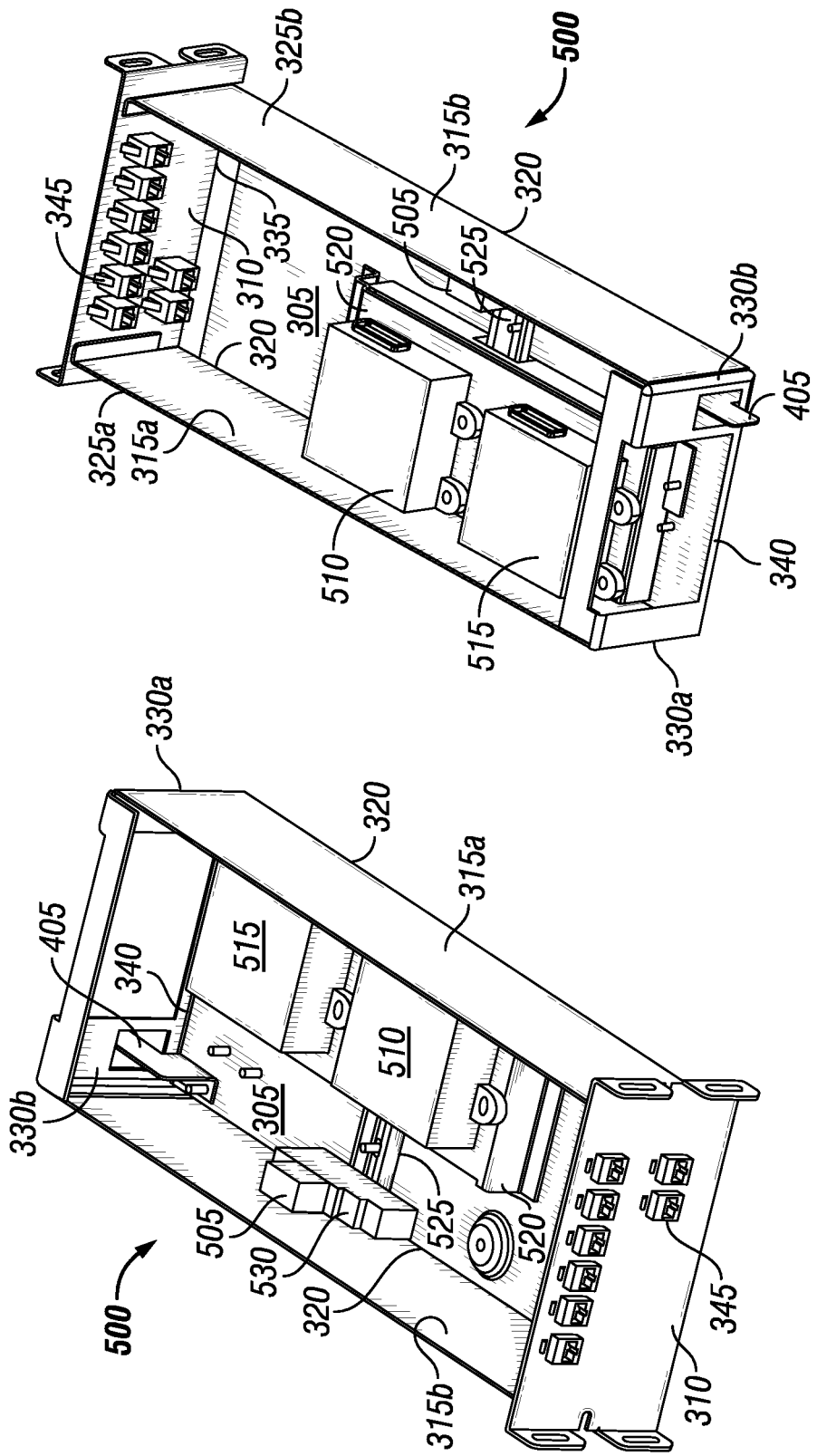

ENCLOSURE WITH MODULAR TRAYS FOR CONTROLLING POWER AND COMMUNICATION

TECHNICAL FIELD

Embodiments of the present disclosure relate to uninterruptible power supplies, more particularly, to an enclosure configured to control an uninterruptible power supply.

BACKGROUND

An uninterruptible power supply (UPS) is an electrical apparatus that provides emergency power to a load when the input power source or mains power fails. The UPS operates for a relatively short amount of time to provide a buffer between when the input power source fails and when subsequent systems start to shut down. Typically, the UPS comprises of a power source such as a plurality of batteries. In some instances, space required for installation of the UPS, the plurality of batteries, and a given system communicatively coupled to the UPS is lacking. In such instances, power management and communication are difficult and may be limiting.

BRIEF DESCRIPTION OF THE DRAWINGS

For a more complete understanding of the present disclosure and its features and advantages, reference is now made to the following description, taken in conjunction with the accompanying drawings, in which:

FIG. 1 illustrates an enclosure, in accordance with an embodiment of the present disclosure;

FIG. 2 illustrates a top view of an enclosure, in accordance with an embodiment of the present disclosure;

FIG. 3 illustrates a power fuse assembly tray, in accordance with an embodiment of the present disclosure;

FIG. 4 illustrates a power fuse assembly tray, in accordance with an embodiment of the present disclosure;

FIG. 5 illustrates a communications assembly tray, in accordance with an embodiment of the present disclosure;

FIG. 6 illustrates a communications assembly tray, in accordance with an embodiment of the present disclosure.

DETAILED DESCRIPTION

Figure 7:
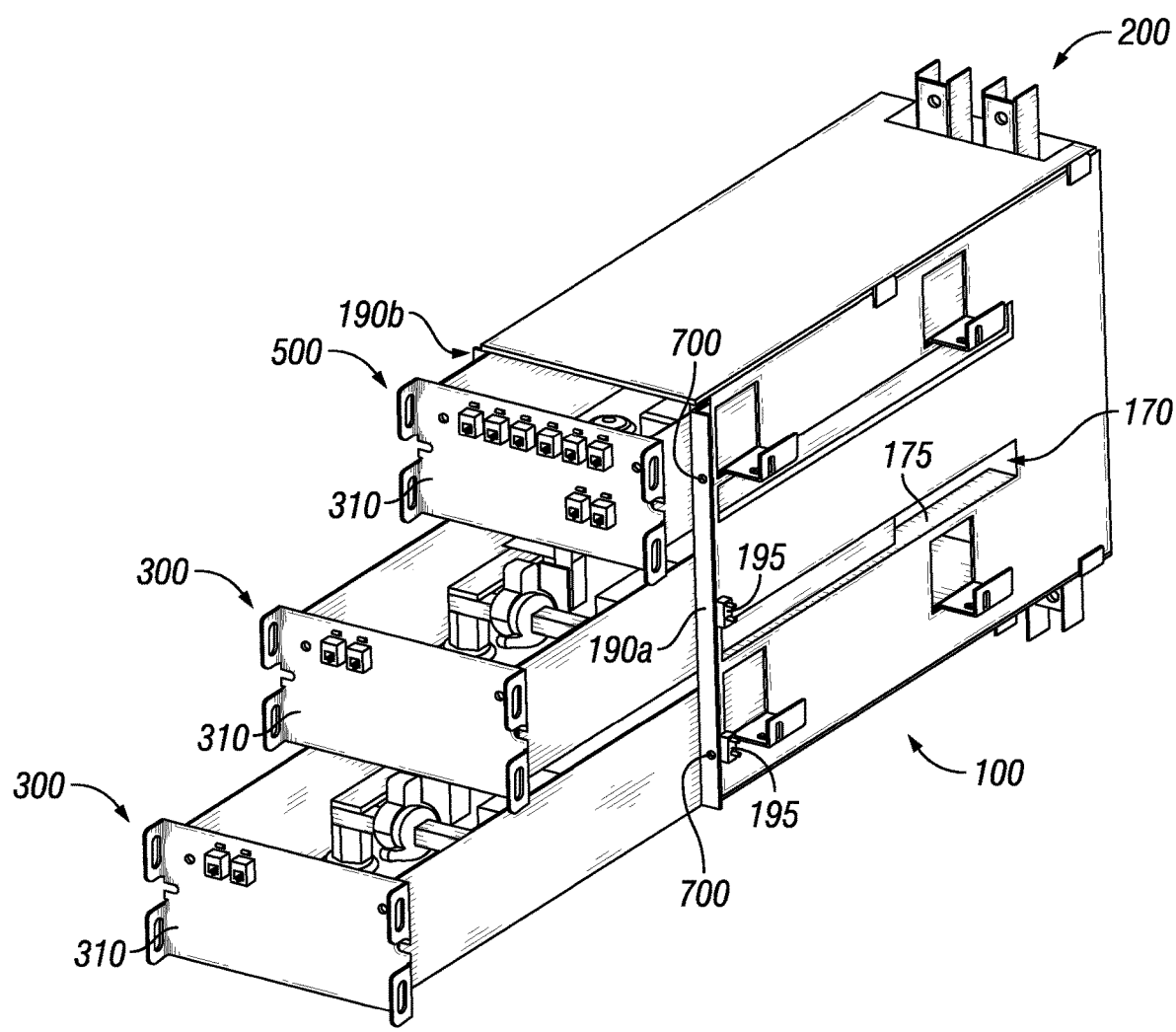
FIG. 7 illustrates an assembled enclosure with trays, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business-related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

In one or more embodiments of the present disclosure, an information handling system may be utilized to control, manage or otherwise operate one or more operations, devices, components, networks, any other type of system or any combination thereof. For purposes of this disclosure, an information handling system may include any instrumentality or aggregate of instrumentalities that are configured to or are operable to compute, classify, process, transmit, receive, retrieve, originate, switch, store, display, manifest, detect, record, reproduce, handle, or utilize any form of information, intelligence, or data for any purpose, for example, for a maritime vessel or operation. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data, instructions or both for a period of time. Computer-readable media may include, for example, without limitation, storage media such as a sequential access storage device (for example, a tape drive), direct access storage device (for example, a hard disk drive or floppy disk drive), compact disk (CD), CD read-only memory (ROM) or CD-ROM, DVD, RAM, ROM, electrically erasable programmable read-only memory (EEPROM), and/or flash memory, biological memory, molecular or deoxyribonucleic acid (DNA) memory as well as communications media such wires, optical fibers, microwaves, radio waves, and other electromagnetic and/or optical carriers; and/or any combination of the foregoing.

FIG. 1 illustrates an isometric view of an enclosure 100 configured to interface with a power source and an uninterruptible power source (UPS). The enclosure 100 may serve to house or contain one or more trays (i.e., power fuse assembly tray 300 or communications assembly tray 500 described further below), wherein the enclosure 100 may protect the components within each of the one or more trays from an external environment. In embodiments, the enclosure 100 may be any suitable size, height, shape, and combinations thereof. The enclosure 100 may comprise of any suitable materials. Without limitations, the enclosure 100 may comprise of metals, nonmetals, polymers, composites, and combinations thereof. The enclosure 100 may comprise of a top wall 105, a bottom wall 110, and sidewalls 115*a*, 115*b*. A bottom end 120 of each of the sidewalls 115*a*, 115*b* may be disposed along opposing sides of the bottom wall 110 so as to be perpendicular to the bottom wall 110. The top wall 105 may couple the sidewalls 115*a*, 115*b* together and be disposed about a top end 125 of the sidewalls 115*a*, 115*b*. As illustrated, the top wall 105 may be disposed parallel to the bottom wall 110. Each sidewall 115*a*, 115*b* may comprise a first edge 130*a*, 130*b* and a second edge 135*a*, 135*b* perpendicular to the bottom end 120 and the top end 125. The top wall 105 may comprise a top first edge 140 and a top second edge 145. The bottom wall 110 may comprise a bottom first edge 150 and a bottom second edge 155.

As illustrated, the configuration of the top wall 105, bottom wall 110, and sidewalls 115a, 115b may generally produce a rectangular prism. There may be a first end 160 of the enclosure 100, wherein the first end 130 is open and defined by the first edges 130a, 130b of the sidewalls 115a, 115b, the top first edge 140, and the bottom first edge 150. There may be a second end 165 of the enclosure 100, wherein the second end 165 is open and defined by the second edges 135a, 135b of the sidewalls 115a, 115b, the top second edge 145, and the bottom second edge 155. In embodiments, the first end 160 may be opposite to the second end 165.

The enclosure 100 may further comprise one or more lateral channels 170 disposed about each of the sidewalls 115a, 115b. In embodiments, the one or more lateral channels 170 may be cut out of each of the sidewalls 115a, 115b along at least a portion of the width of the sidewalls 115a, 115b. The one or more lateral channels 170 may be disposed about any suitable location and configuration about each sidewall 115a, 115b. Without limitations, the one or more lateral channels 170 may be disposed parallel to the width of the sidewalls 115a, 115b. In embodiments, the one or more lateral channels 170 of sidewall 115a may mirror the one or more lateral channels 170 of sidewall 115b. The one or more lateral channels 170 may be any suitable size, height, shape, and combinations thereof. In embodiments, the one or more lateral channels 170 may generally be rectangular.

There may be an inner rim 175 disposed about a bottom edge 180 of each of the one or more lateral channels 170. Each one of the inner rims 175 may be any suitable size, height, shape, and combinations thereof. In embodiments, each one of the inner rims 175 may generally be rectangular and may have the same dimensions as the other inner rims 175. The inner rims 175 may extend perpendicularly from the sidewalls 115a, 115b towards the interior of the enclosure 100.

The enclosure 100 may further comprise one or more flanges 185 disposed about each of the sidewalls 115a, 115b. The one or more flanges 185 may be disposed about any suitable location and configuration about each sidewall 115a, 115b. In embodiments, the location of the one or more flanges 185 of sidewall 115a may be mirrored by the location of the one or more flanges 185 of sidewall 115b. The one or more flanges 185 may be any suitable size, height, shape, and combinations thereof. In embodiments, the one or more flanges 185 may be used to mount the enclosure to an external structure. The one or more flanges 185 may protrude out from the sidewalls 115a, 115b in a direction opposite of the inner rims 175. Without limitations, each of the one or more flanges 185 may provide a hole for fasteners to be disposed through in order to mount the enclosure 100.

The enclosure 100 may further comprise outer rims 190a, 190b. The outer rims 190a, 190b may be disposed about the first edges 130a, 130b of the sidewalls 115a, 115b and perpendicular to the sidewalls 115a, 115b. The outer rims 190a, 190b may be disposed along at least a portion of the length of the first edges 130a, 130b. There may be one or more micro-switches 195 disposed onto the sidewalls 115a, 115b and adjacent to the outer rims 190a, 190b. In embodiments, there may be two micro-switches 195 disposed on sidewall 115a and two other micro-switches disposed on sidewall 115b. In these embodiments, the locations of the two micro-switches 195 of sidewall 115a may be mirrored by the location of the two micro-switches 195 of sidewall 115b.

FIG. 2 illustrates a top view of the enclosure 100. With reference now to both FIGS. 1-2, enclosure 100 may be disposed near a bus duct 200 and coupled to the bus duct 200. In one or more embodiments, the bus duct 200 may be communicatively coupled to a main breaker. The bus duct 200 may comprise one or more busbars 205 for use in local high-power distribution. The one or more busbars 205 may be any suitable size, height, shape, and combinations thereof. In embodiments, the one or more busbars 205 may be flat, rectangular strips of suitable material, wherein the suitable material may be, but is not limited to, copper, brass, aluminum, and combinations thereof.

The bus duct 200 may further comprise one or more power connectors 210 and one or more insulators 215. The one or more power connectors 210 may be configured to couple and provide an interface between a tray (i.e., power fuse assembly tray 300 or communications assembly tray 500) and one of the one or more busbars 205. The one or more power connectors 210 may join together the electrical termination of the tray with one of the one or more busbars 205 to create an electrical circuit. Any suitable type of electrical connector may be used as one or more power connectors 210. In embodiments, the one or more insulators 215 may provide local, structural support to the one or more busbars 205. The one or more insulators 215 may prevent electrical dissipation from the one or more busbars 205 into surrounding structural components. In embodiments, the one or more insulators 215 may be any suitable size, height, shape, and combinations thereof.

FIGS. 3-4 illustrate isometric views of a power fuse assembly tray 300. FIG. 3 illustrates a front view of the power fuse assembly tray 300, and FIG. 4 illustrates a back view of the power fuse assembly tray 300. The power fuse assembly tray 300 may comprise of a tray bottom wall 305, a front wall 310, and tray sidewalls 315a, 315b. A bottom end 320 of each of the tray sidewalls 315a, 315b may be disposed along opposing sides of the tray bottom wall 305 so as to be perpendicular to the tray bottom wall 305. Each tray sidewall 315a, 315b may comprise a first edge 325a, 325b (best seen on FIG. 4) and a second edge 330a, 330b perpendicular to the bottom end 320. The tray bottom wall 305 may comprise a bottom first edge 335 (as best seen on FIG. 4) and a bottom second edge 340. As illustrated, the front wall 310 may be disposed at the first edges 325a, 325b of the tray sidewalls 315a, 315b and at the bottom first edge 335 of the tray bottom wall 305 so as to be perpendicular to both the tray sidewalls 315a, 315b and the tray bottom wall 305. The front wall 310 may comprise of one or more communication ports 345. The one or more communication ports 345 may be disposed about the front wall 310 in any suitable manner. In embodiments, the one or more communication ports 345 may provide for an external piece of equipment, such as an additional power fuse assembly tray 300 and/or a communications assembly tray 500 (as shown in FIGS. 5-6), to be communicatively coupled with the internal components of the power fuse assembly tray 300. Without limitations, the one or more communication ports 345 may be a RJ-45 registered jack, wherein the one or more communication ports 345 are compatible with RJ-45 cable that may be shielded and/or unshielded. In embodiments, the one or more communications ports 345 may be used for tray-to-tray communication, for communication with a printed circuit board (PCB), as service ports, and combinations thereof.

As illustrated, the power fuse assembly tray 300 may comprise of a fuse 350, a direct current (DC) contactor 355, a standoff 360, a busbar bracket 365, a plurality of busbars 205, and a Hall current transformer 370. In one or more embodiments, the foregoing components within the power fuse assembly tray 300 may be coupled together through wiring. The fuse 350 may be configured to provide overcurrent protection for an electrical circuit, and any suitable fuse may be used as the fuse 350. In embodiments, the fuse 350 may comprise a sacrificial element mounted between electrical terminals contained in a housing. Without limitations, a 1300 Volt 280 Amperage Ferraz Shawmut fuse may be used as the fuse 350. In embodiments, the DC contactor 355 may be an electrically-controlled switch used for switching an electrical power circuit. As shown, there may be one or more DC contactors 355 within the power fuse assembly tray 300. In embodiments, the DC contactor 355 may comprise a housing, a coil or electromagnet, and contacts. The coil or electromagnet may be disposed within the housing, wherein the housing is constructed from suitable insulating materials. During operations, the contacts may be energized to be communicatively coupled and complete the circuit. Without limitations, high-duty cycle DC contactors may be used as the one or more DC contactors 355.

These internal components of the power fuse assembly tray 300 may be coupled together through the plurality of busbars 205. As illustrated, a first circuit 375 may be formed between the fuse 350 and one of the one or more DC contactors 355. A first power input busbar 380 may draw current from the bus duct 200 (referring to FIG. 2) that may flow to the fuse 350. The current may then continue to one of the one or more DC contactors (herein referred to as "DC contactor 355*a*") and flow out of the power fuse assembly tray 300 through a first power output busbar 385 to the bus duct 200. In embodiments, both the first power input busbar 380 and the first power output busbar 385 may be coupled to the bus duct 200.

The first circuit 375 may comprise of the Hall current transformer 370. The Hall current transformer 370 may be disposed around one or the plurality of busbars 205 between the fuse 350 and the DC contactor 355*a*. The Hall current transformer 370 may be configured to measure the amperage of the current flowing through the first circuit 375 for product performance and for integration into software use for PCB current measurements.

As illustrated, there may be one or more standoffs 360 and/or one or more busbar brackets 365. The one or more standoffs 360 may be disposed underneath one or more busbars 205 and on top of the tray bottom wall 305 to support the one or more busbars 205. In embodiments, the one or more standoffs 360 may be constructed from insulating material. The one or more busbar brackets 365 may be disposed on the tray bottom wall 305 to support one of the plurality of busbars 205. The one or more busbar brackets 365 may be constructed of insulating material. In embodiments, suitable fasteners may be used to secure one of the plurality of busbars 205 to one of the one or more busbar brackets 365.

There may be a second circuit 390 provided by the power fuse assembly tray 300. The second circuit 390 may comprise one of the one or more DC contactors (herein referred to as "DC contactor 355*b*"). A second power input busbar 395 may draw current from the bus duct 200 (referring to FIG. 2) that may flow to the DC contactor 355*b* and flow out of the power fuse assembly tray 300 through a second power output busbar 400 to the bus duct 200.

As illustrated, there may be a grounding busbar 405 disposed about an opposite end of the power fuse assembly tray 300 from the front wall 310. The grounding busbar 405 may be configured to provide a return path for electrical current for safety. The grounding busbar 405 may enable the tray bottom wall 305 to be grounded with regards to the enclosure 100 (referring to FIG. 1).

FIGS. 5-6 illustrate isometric views of a communications assembly tray 500. FIG. 5 illustrates a front view of the communications assembly tray 500, and FIG. 6 illustrates a back view of the communications assembly tray 500. The communications assembly tray 500 may be configured in a similar fashion as the power fuse assembly tray 300 (referring to FIGS. 3-4). The communications assembly tray 500 may comprise of the tray bottom wall 305, the front wall 310, and tray sidewalls 315*a*, 315*b*. The bottom end 320 of each of the tray sidewalls 315*a*, 315*b* may be disposed along opposing sides of the tray bottom wall 305 so as to be perpendicular to the tray bottom wall 305. Each tray sidewall 315*a*, 315*b* may comprise first edge 325*a*, 325*b* (as best seen on FIG. 6) and second edge 330*a*, 330*b* perpendicular to the bottom end 320. The tray bottom wall 305 may comprise bottom first edge 335 (as best seen on FIG. 6) and a bottom second edge 340. As illustrated, the front wall 310 may be disposed at the first edges 325*a*, 325*b* of the tray sidewalls 315*a*, 315*b* and at the bottom first edge 335 of the tray bottom wall 305 so as to be perpendicular to both the tray sidewalls 315*a*, 315*b* and the tray bottom wall 305. The front wall 310 may comprise of one or more communication ports 345. The one or more communication ports 345 may be disposed about the front wall 310 in any suitable manner. In embodiments, the one or more communication ports 345 may provide for an external piece of equipment to be communicatively coupled with the internal components of the communications assembly tray 500. Without limitations, the one or more communication ports 345 may be a RJ-45 registered jack, wherein the one or more communication ports 345 are compatible with RJ-45 cable that may be shielded and/or unshielded. In embodiments, the one or more communications ports 345 may be used for tray-to-tray communication, for communication with a PCB, as service ports, and combinations thereof.

As illustrated, the communications assembly tray 500 may comprise of a contactor relay 505, a first battery monitoring unit (BMU) 510, a second BMU 515, a base 520, a din rail 525, and the grounding busbar 405. In one or more embodiments, the foregoing components within the communications assembly tray 500 may be coupled together through wiring. In embodiments, the contactor relay 505 may be an electrically-controlled switch used for switching an electrical power circuit. As illustrated, the contactor relay 505 may be disposed on a mounting 530 (as best seen on FIG. 5), wherein the mounting 530 couples the contactor relay 505 to the din rail 525. During operations, the contactor relay 505 may be energized to be communicatively coupled and complete the circuit. In one or more embodiments, the contactor relay 505 may be used to connect or disconnect the grounding for the first BMU 510 and/or the second BMU 515, wherein there may be wiring coupling the contactor relay 505 to the first BMU 510 and/or to the second BMU 515.

In embodiments, both the first BMU 510 and the second BMU 515 may be any suitable size, height, shape, and combinations thereof. The first BMU 510 and the second BMU 515 may comprise of any suitable material. In embodiments, the first BMU 510 and the second BMU 515 may have the same dimensions and specifications. Both the first BMU 510 and the second BMU 515 may comprise of printed circuit board. As illustrated, the first BMU 510 and/or the second BMU 515 may be disposed on the base 520, wherein the base 520 is coupled to the tray bottom wall 305. The first BMU 510 and the second BMU 515 may be configured to communicate and control external information handling systems.

In one or more embodiments, an external battery unit may comprise a cell module unit (CMU). There may be a plurality of external battery units collectively comprising a battery string. The CMU may monitor the external battery unit. Without limitations, the first BMU 510 and/or the second BMU 515 may receive information from one or more CMUs in a string file format. In embodiments, the first BMU 510 and/or the second BMU 515 may be communicatively coupled to a main PCB. The first BMU 510 and/or the second BMU 515 may transmit the information received from the CMUs to the main PCB for further data processing. Each of first BMU 510 and second BMU 515 may accommodate all of the CMUs per battery string, which may be required to achieve the voltage and amperage required for the product. Combining the plurality of battery strings together may allow the enclosure 100 a set amount of run-time before the plurality of external battery units are depleted and require charging As illustrated, the grounding busbar 405 may be disposed about an opposite end of the communications assembly tray 500 from the front wall 310. The grounding busbar 405 may be configured to provide a return path for electrical current for safety. The grounding busbar 405 may enable the tray bottom wall 305 to be grounded with regards to the enclosure 100 (referring to FIG. 1).

FIG. 7 illustrates an embodiment of the enclosure 100. As illustrated, the power fuse assembly tray 300 and the communications assembly tray 500 may be disposed within the enclosure. Without limitations, there may be one or more power fuse assembly trays 300 and/or one or more communications assembly trays 500 disposed within the enclosure 100. As illustrated, the communications assembly tray 500 may be disposed above two power fuse assembly trays 300. In embodiments, the communications assembly tray 500 and the two power fuse assembly trays 300 may be disposed within the enclosure in any suitable configuration. During insertion of the communications assembly tray 500 and the two power fuse assembly trays 300, the communications assembly tray 500 and the power fuse assembly tray 300 disposed underneath the communications assembly tray 500 may slide along the inner rims 175 of the one or more lateral channels 170. The remaining power fuse assembly tray 300 may be disposed underneath the other two trays and may slide along the bottom wall 110 (referring to FIG. 1) of the enclosure 100. As previously described, the enclosure 100 may be disposed about the bus duct 200. As the communications assembly tray 500 and the two power fuse assembly trays 300 are fully inserted into the enclosure 100, the grounding busbar 405 (referring to FIGS. 3-6), the first power input busbar 380 (referring to FIGS. 3-4), the first power output busbar 385 (referring to FIGS. 3-4), the second power input busbar 390 (referring to FIGS. 3-4), the second power output busbar 395 (referring to FIGS. 3-4), and combinations thereof may be electrically coupled to the bus duct 200.

While the communications assembly tray 500 and the two power fuse assembly trays 300 are depicted as being partially out of the enclosure 100, it would be apparent to one of ordinary skill in the art that the front wall 310 of any one of the communications assembly tray 500 and the two power fuse assembly trays 300 may be adjacent to and flush with the outer rims 190a, 190b when the communications assembly tray 500 and the two power fuse assembly trays 300 are fully inserted into the enclosure 100. To secure the communications assembly tray 500 and the two power fuse assembly trays 300 to remain fully inserted into the enclosure 100, a suitable fastener, such as, but not limited to, a screw or a bolt, may be threaded through a hole 700 disposed in the outer rims 190a, 190b and into the micro-switches 195 disposed on the sidewalls 115a, 115b (sidewall 115 as seen on FIG. 1) adjacent to the outer rims 190a, 190b. In one or more embodiments, the micro-switches 195 may indicate, through, but not limited to, switching between electric circuits to display a light that the communications assembly tray 500 and/or the power fuse assembly trays 300 have been properly installed within the enclosure 100. Such an indication may enable the contactor relay 505 (referring to FIGS. 5-6) and/or the DC contactors 355 (referring to FIGS. 3-4) to connect terminals to form a completed circuit in order for operation of the enclosure 100.

The foregoing embodiment of the enclosure 100 with communications assembly tray 500 and power fuse assembly trays 300 may be disposed about a plurality of battery strings. Each battery string may comprise a plurality of battery units to be used as a power source, wherein the plurality of battery units may be arranged in series, in parallel, and combinations thereof in a given battery string.

Although the disclosure and its advantages have been described in detail, it should be understood that various changes, substitutions and alterations can be made herein without departing from the spirit and scope of the disclosure as defined by the following claims.

What is claimed is:

1. An enclosure, comprising:
a top wall;
a bottom wall, wherein the bottom wall is disposed parallel to the top wall;
sidewalls, wherein a bottom end of each of the sidewalls is disposed along opposing sides of the bottom wall so as to be perpendicular to the bottom wall, wherein the top wall is disposed about a top end of each of the sidewalls;
a communications assembly tray;
one or more power fuse assembly trays, wherein the one or more power fuse trays are disposed below the communications assembly tray within the enclosure, wherein the communications assembly tray and the one or more power fuse assembly trays each comprise:
a tray bottom wall;
a front wall; and
tray sidewalls, wherein a bottom end of each of the tray sidewalls is disposed along opposing sides of the tray bottom wall so as to be perpendicular to the tray bottom wall, wherein each of the tray sidewalls comprises a first edge and a second edge perpendicular to the bottom end, wherein the tray bottom wall comprises a bottom first edge and a bottom second edge, wherein the front wall is disposed at the first edges of the tray sidewalls and at the bottom first edge of the tray bottom wall so as to be perpendicular to both the tray sidewalls and the tray bottom wall; and
one or more micro-switches, wherein the one or more micro-switches are disposed onto the sidewalls, wherein the one or more micro-switches are configured to secure and indicate that the communications assembly tray and the one or more power fuse trays have been secured into the enclosure.

2. The enclosure of claim 1, further comprising one or more lateral channels, wherein the one or more lateral channels are disposed about each of the sidewalls along at least a portion of the width of the sidewalls.

3. The enclosure of claim 2, further comprising an inner rim, wherein the inner rim is disposed about a bottom edge of each of the one or more lateral channels, wherein the inner rim extends perpendicularly from the sidewalls to an interior of the enclosure.

4. The enclosure of claim 3, wherein the communications assembly tray is disposed within the enclosure, wherein the communications assembly tray is configured to slide along the inner rim.

5. The enclosure of claim 3, wherein the one or more power fuse assembly trays are disposed within the enclosure, wherein the one or more power fuse assembly trays are configured to slide along the inner rim.

6. The enclosure of claim 1, further comprising one or more flanges, wherein the one or more flanges are disposed about each of the sidewalls.

7. The enclosure of claim 1, further comprising outer rims, wherein the outer rims are disposed about first edges of the sidewalls and perpendicular to the sidewalls, wherein the outer rims are disposed along at least a portion of the length of the first edges.

8. The enclosure of claim 7, wherein the one or more micro-switches are disposed onto the sidewalls and adjacent to the outer rims.

9. The enclosure of claim 1, wherein the enclosure is coupled to and disposed about a bus duct, wherein the bus duct comprises:
   one or more busbars;
   one or more power connectors; and
   one or more insulators.

10. The enclosure of claim 1, further comprising one or more communication ports disposed about the front wall, wherein the one or more communication ports are RJ-45 registered jacks.

11. The enclosure of claim 1, further comprising a grounding busbar, wherein the grounding busbar is disposed at an opposite end of the front wall.

12. The enclosure of claim 1, wherein the one or more power fuse assembly trays each comprise:
   a fuse;
   one or more direct current (DC) contactors;
   one or more standoffs;
   a busbar bracket;
   a plurality of busbars; and
   a Hall current transformer.

13. The enclosure of claim 12, wherein a first circuit is defined by the fuse, the Hall current transformer, and one of the one or more DC contactors, wherein each of the fuse, Hall current transformer, and one of the one or more DC contactors is coupled to the plurality of busbars.

14. The enclosure of claim 12, wherein a second circuit is defined by one of the one or more DC contactors, wherein the one of the one or more DC contactors is coupled to the plurality of busbars.

15. The enclosure of claim 12, wherein the one or more standoffs are disposed underneath at least one of the plurality of busbars and on top of the tray bottom wall to support the at least one of the plurality of busbars.

16. The enclosure of claim 12, further comprising one or more busbar brackets, wherein the one or more busbar brackets are disposed on top of the tray bottom wall to support at least one of the plurality of busbars, wherein the at least one of the plurality of busbars is secured to the one or more busbar brackets through a fastener.

17. The enclosure of claim 1, wherein the communications assembly tray comprises:
   a contactor relay;
   a first battery monitoring unit (BMU);
   a second BMU;
   a base; and
   a din rail.

18. The enclosure of claim 17, wherein the contactor relay is disposed on a mounting, wherein the mounting couples the contactor relay to the din rail.

19. The enclosure of claim 17, wherein the contactor relay is coupled to the first BMU and the second BMU, wherein the contactor relay is configured to connect and disconnect the grounding for the first BMU and the second BMU.

20. The enclosure of claim 17, wherein the first BMU and the second BMU are disposed on the base, wherein the base is coupled to the tray bottom wall, wherein the first BMU and the second BMU are communicatively coupled to a main printed circuit board (PCB) and a cell module unit (CMU) of an external battery unit.

* * * * *